United States Patent

Matsuda

[15] 3,693,527
[45] Sept. 26, 1972

[54] CAMERA ACTUATOR MECHANISM WITH AN ELECTRONIC TIMER

[72] Inventor: Mutsuhide Matsuda, Tokyo, Japan

[73] Assignee: Canon Kabushiki Kaisha, Tokyo, Japan

[22] Filed: May 13, 1970

[21] Appl. No.: 36,713

[30] Foreign Application Priority Data

May 20, 1969 Japan ...................... 44/38867

[52] U.S. Cl. ................. 95/53 E, 95/10 CT, 95/53 EB
[51] Int. Cl. ........................... G03b 7/08, G03b 9/62
[58] Field of Search ........................ 95/53 EB, 10 CT

[56] References Cited

UNITED STATES PATENTS

| | | | |
|---|---|---|---|
| 3,504,604 | 4/1970 | Kitai | 95/53 EB |
| 3,513,761 | 5/1970 | Kiper | 95/53 EB |

*Primary Examiner*—Samuel S. Matthews
*Assistant Examiner*—Russell E. Adams, Jr.
*Attorney*—McGlew and Toren

[57] ABSTRACT

In the camera actuator mechanism disclosed, two series main switches serve to energize an electronic timer. One of the switches is normally closed. A shutter release holds the other switch open. As the shutter release is depressed to snap a picture it first performs preliminary functions other than opening the shutter. During this stage of depression the shutter release closes the open switch. The shutter release forms a ratchet-pawl arrangement with a pivotally mounted locking member. When the shutter release reaches a second position from its first, undepressed position, the locking member locks the shutter release in the second position and simultaneously is pivoted by the shutter release to open the normally-closed switch. In that second position the open switch closes. When the shutter release reaches a third position it allows the locking member to pivot around. This releases the shutter release and at the same time allows the normally-opened switch to close. The other switch remains closed. Thus both switches are closed only when the shutter release is depressed to its third position. This prevents needless use of electrical power while the shutter release performs its preliminary function in the first and second position. From its third position the shutter release returns to its first position.

7 Claims, 2 Drawing Figures

CAMERA ACTUATOR MECHANISM WITH AN ELECTRONIC TIMER

The present invention relates to a camera actuator mechanism with an electronic timer.

In a known device, the shutter release rod is locked so as to prevent it from returning back to its original position in spite of removal of the pressure thereon. When a definite stroke in the beginning of shutter release is passed, and the shutter and the film winder lock are released, then the release rod is unlocked and allowed to return back to its original position.

If such a device is applied to a camera with an electronic timer, inconvenience may be caused while the release rod is locked because a closed switch activated by the rod may allow useless current flow in the timer circuit, especially when the photographing is interrupted while the shutter is pushed halfway down.

The object of the present invention is to eliminate such an inconvenience.

The present invention will be explained by way of accompanying drawings which show an embodiment of the present invention, as follows.

Figure 1:
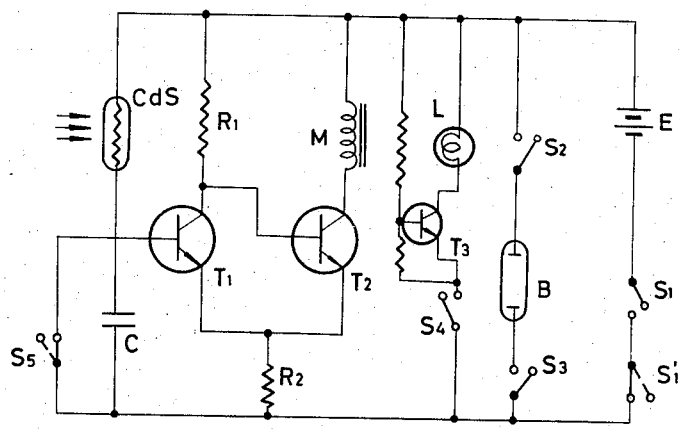
FIG. 1 is an electronic timer circuit diagram for a camera applicable to the present invention.

In FIG. 1, members $S_1$, $S_1'$ and $S_2$, $S_3$, $S_4$ and $S_5$ serve respectively as a first main switch, a second main switch, an igniter switch for a flash valve B, a safety switch in the flash circuit, a checker switch for a battery E, and a start switch for the timer. In the checker circuit, there is provided an indicator lamp L and a transistor $T_3$. Reference character CdS stands for a photo-resistor and C designates a condenser. Elements $T_1$ and $T_2$ are switching transistors, $R_1$ and $R_2$ are resistors and M is an electro-magnet.

Figure 2:
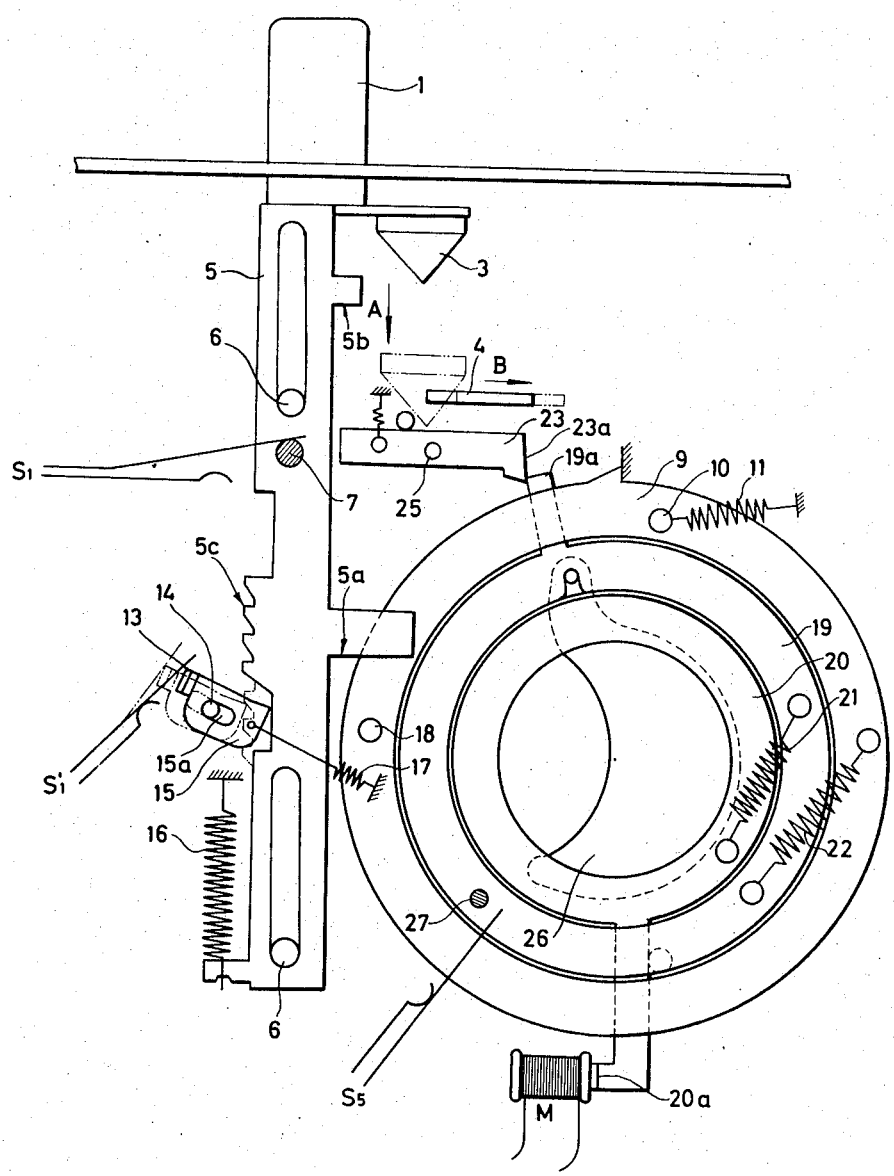
FIG. 2 is a schematic front view showing an embodiment of the present invention.

As shown in FIG. 2, an actuator member 5 having a shutter button 1 slides up and down under the guidance of pins 6, which are provided on the camera body. On the actuator member a pin 7 made of insulating material normally opens the first main switch $S_1$ of the electronic timer circuit shown in FIG. 1. The actuator member 5 is normally pulled up by a spring 16. When the shutter button 1 is pushed down, the release actuating member 5 is moved in the direction of the arrow A and the first switch $S_1$ is closed by the pin 7. The current then begins to flow in the electro-magnet M. When the button 1 is further pushed down in the direction A, a charger arm 5a rotates a shutter charge ring 9 in a counter-clockwise direction while pushing a pin 18 provided on the ring 9 and energizing springs 11 and 22. Successively, another starter arm 5b pushes down a release lever 23 so as to rotate around an axle 25 and disengage a portion 23a from a portion 19a of an opening ring 19 for shutter blades 26. The ring 19 rotates in the counter-clockwise direction by the spring 22, thus opening the shutter blades 26. At the same time, a starter switch $S_5$ is opened by a pin 27 provided on the ring 19 to start the charging across a condenser C shown in FIG. 1. After a definite time determined by the condenser C and a photo-resistor CdS, the current flowing in the magnet M is interrupted, and a projection 20a of a closing ring 20 for the shutter blades 26 is disengaged from the magnet M by a spring 21 and is rotated in the counter-clockwise direction to close the shutter blades 26. When the downward force on the actuator member 5 is removed, the member 5 is returned upwards to its original position by the spring 16. The ring 9 comes back to its original position, and also the opening and closing rings 10 and 20 come back to their original positions under the closed condition of the shutter blades. A conical lug 3 is provided on he actuator member 5. When the actuator is pushed down, the lug 3 moves a locking lever 4 of a film winder in the direction of an arrow B to release the locking of the winder.

On the actuator member 5, a saw-tooth projection 5c can engage a change-over means 15 having a projection 13, which is provided with a slot 15a, in which a pin 14 is fixedly provided. The change-over means 15 is stopped in the first portion under the tension of a spring 17 one end of which is fixed to the change-over means 15 and the other end of which is fixed to the camera body. When the actuator member 5 is moved in the direction of A, the change-over member 15 swings the pin 14 around in the second portion, and when the change-over means 15 surpasses a definite stroke in the second portion, if the push-down force is removed, the lower end of the change-over means engages with the projection 5c as shown by a dot-dash line. In this way the actuator member 5 is locked and cannot return back to its original position. At this moment, the first main switch $S_1$ is open, but when the change-over means 15 engages the projection 5c, the change-over means is shifted by the spring 16 over a length as much as the clearance between said slot 15a and the diameter of said pin 14. Thus the second main switch $S_1'$ of normally closed type is pushed by the tip of the projection 13 to open the circuit position, thus preventing the flow of useless current in the circuit.

When the button 1 is pushed down further to the third portion, the shutter is opened and closed thereafter as mentioned above. The change-over means 15 engages with the uppermost tooth of the saw-tooth projection 5c and turns over. Thus, the actuator member 5 is permitted to return back upward. When the change-over means is positioned in the first portion of the actuator member, the second main switch is closed while the first main switch is opened. When the change-over means is positioned in the second portion of the actuator member, the second main switch is opened while the first main switch is closed. When the change-over means is positioned in the third portion of the actuator member, both the first and second mains switches are closed. Thus the power consumption is much reduced, and non-intentional photographing is also avoided.

What is claimed is:

1. An apparatus for actuating an electrically timed camera shutter control, comprising two switch means connected in series with each other and with the shutter control for passing current through the shutter control when both of said switch means are closed, manually operable shutter actuating means biased into an inactive position and coupled to one of said switch means to open the one of said switch means in the inactive position, said actuating means being movable toward a shutter actuating position at which both of said switch means are closed, locking mean coacting with a portion of said actuating means for preventing said actuating means from returning to the inactive position when said actuating means has been moved from the inactive position and for allowing said actuating means to return to the inactive position after said actuating means reaches the actuating position, said locking means being coupled to the other one of said switch means for opening the other one of said switch means when said actuating means has moved from the inactive position and for closing the other one of said switch means when said actuating means reaches the actuating position.

2. An apparatus as in claim 1, wherein said actuating means moves said locking means relative to said actuating means.

3. An apparatus as in claim 2, wherein said locking means assumes a given orientation when said actuating means has advanced from the inactive position, the other one of said switch means being responsive to the given orientation of said locking means.

4. An apparatus as in claim 1, wherein said actuating means includes a ratchet and said locking means includes a pawl located adjacent said ratchet for engagement therewith, the other one of said switch means being responsive to the position of said pawl.

5. An apparatus as in claim 4, wherein said ratchet disengages from said pawl when said actuating means reaches the actuating position.

6. An apparatus as in claim 5, wherein said actuating means includes a movable rod having projections extending transversely to the rod, and wherein said pawl is rotatable and disengageable from said ratchet, said pawl being effective to close the other one of said switch means when disengaged from the ratchet and open the other one of said switch means when engaged with the ratchet.

7. An apparatus as in claim 6, wherein said ratchet is mounted on said rod, said rod moving from the inactive to the actuating position and actuating the shutter with said projections, said pawl being disengaged from said rod in the inactive and actuating positions and engaging the rod between the positions.

* * * * *